Jan. 23, 1968  E. FLOYD, JR., ET AL  3,365,681
CONNECTION MEANS FOR WAVE GUIDE MEANS
Original Filed July 1, 1965   2 Sheets-Sheet 2

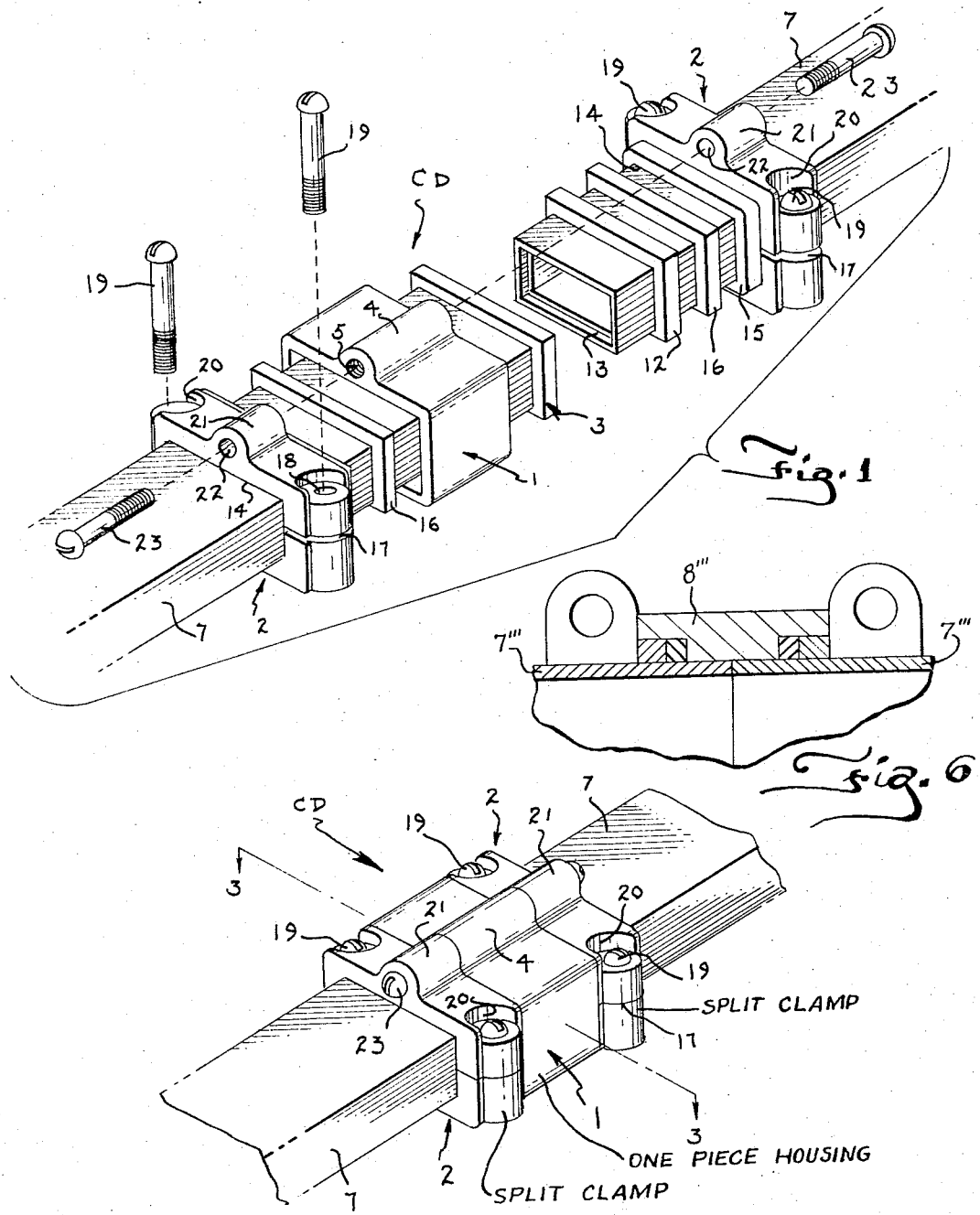

INVENTOR.
EDWIN FLOYD, JR.
EALOR PAUL HOLLAND
BY Curtis, Morris & Safford

United States Patent Office 3,365,681
Patented Jan. 23, 1968

3,365,681
CONNECTION MEANS FOR WAVE
GUIDE MEANS
Edwin Floyd, Jr., Lower Paxton Township, Harrisburg, and Ealor Paul Holland, York, Pa., assignors to AMP Incorporated, Harrisburg, Pa.
Continuation of application Ser. No. 468,793, July 1, 1965. This application Apr. 18, 1967, Ser. No. 631,841
17 Claims. (Cl. 333—98)

The present application is a continuation of application 468,793, filed on July 1, 1965, now abandoned.

This invention relates to connection means and more particularly to connection means for interconnecting the ends of tubular members, such as for example, wave guide means.

In order to apply a flange member to the end of a rectangular or circular wave guide, it is conventional practice to weld or solder a flange onto the ends of wave guide members. The heat generated to effect the welding, brazing or soldering of the flanges onto the wave guide members causes distortion of the inside dimensions of the wave guide members and plating has to be effected over the welded joints so that continuity is established. This is undesirable, because the inside dimensions of the wave guide are critical and the plating of the welded joints adds an additional step which is costly.

It is, therefore, a primary object of the present invention to provide connection means for wave guide means which obviates the above-mentioned disadvantages.

Another object of the invention is the provision of connection means that include clamping means that are removable from wave guide means.

A further object of the invention is to provide a connection device for wave guide members that is adjustable along the wave guide members.

An additional object of the invention is to provide a connection device for wave guide members including a housing member in which the ends of the wave guide members are aligned.

A still further object of the present invention is to provide connection means for wave guide means which are secured thereon without the aid of welding.

Still an additional object of the invention is to provide a connection device for wave guide members including a housing member in which the ends of the wave guide members are disposed and secured in aligned position therein.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of a connection device construction including clamping members that are clampable onto wave guide members adjacent the ends thereof, a housing member having an opening extending therethrough which corresponds to the cross-sectional configuration of the wave guide members, an aligning means within the housing member against which the ends of the wave guide members engage to provide proper alignment between the ends of the wave guide members, and means are provided to secure the clamping members to the housing member so that the ends of the wave guide members are brought into engagement with the aligning member.

In the drawings:

FIGURE 1 is a perspective exploded view of parts of a connection device for application to wave guide means;

FIGURE 2 is a perspective view of the connection device on wave guide means interconnecting the wave guide means;

FIGURE 6 is a view similar to that of FIGURE 3 but illustrating an additional embodiment.

Figure 3:
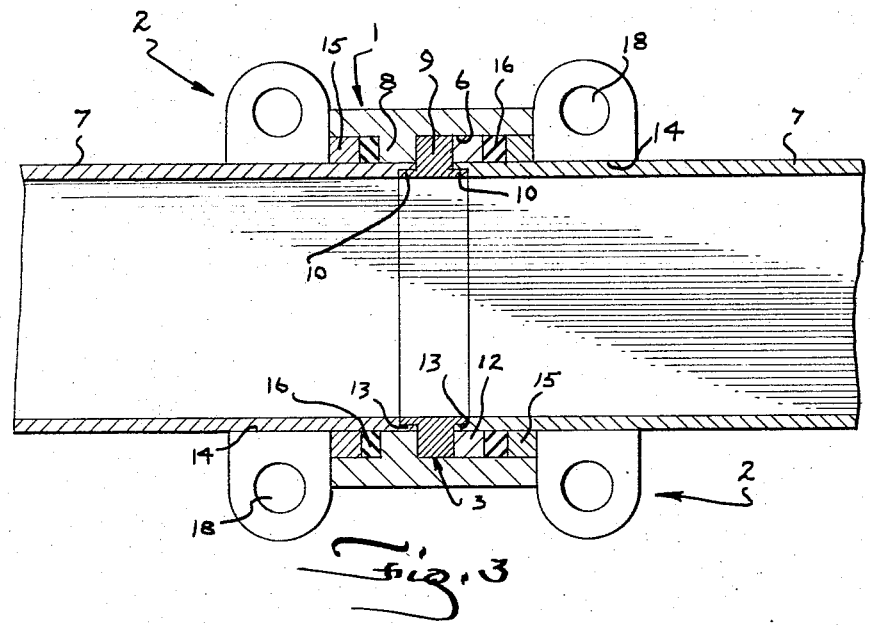
FIGURE 3 is a cross-sectional view taken along lines 3—3 of FIGURE 2.

Turning now to the drawings and more particularly FIGURES 1 through 3, there is illustrated a connection device CD including a housing member 1, clamping members 2 and an aligning member 3. Housing member 1 has a generally rectangular configuration and includes arcuate shaped projections 4 extending outwardly from the top and bottom surfaces. A threaded hole 5 extends through each of projections 4. An opening 6 extends through housing member 1 and has a configuration corresponding to that of the cross-sectional configuration of wave guide members 7. As can be discerned, the wave guide members have a rectangular configuration, but they can assume any configuration that is known in the field of wave guides.

A flange 8 extends outwardly from the surface of opening 6 and the dimensions of flange 8 are such that flange 8 is only slightly larger than the exterior dimensions of the wave guide members. Aligning member 3 is placed in housing member 1 and includes a section 9 that engages a surface of flange 8 as illustrated in FIGURE 3. Flange sections 10 extend outwardly from section 9 and the inner surface of section 9 and flange sections 10 delimit an opening 11 which has a configuration corresponding to that of the interior configuration of wave guide members 7. A retaining ring 12 having a configuration corresponding to that of flange 8 is pressed within opening 6 of housing member 1 and against section 9 so as to retain aligning member 3 within housing member 1 and secured between flange 8 and retaining ring 12. As can be discerned from FIGURE 3, flange sections 10 are spaced outwardly from flange 8 and retaining ring 12 in order to form stepped sections that mate with stepped portions 13 which are formed in the ends of wave guide members 7.

Each of clamping members 2 is similar to the clamping members disclosed in U.S. patent application Ser. No. 429,722, filed Feb. 2, 1965, now abandoned, and assigned to the present assignee. Each of clamping members 2 has an opening 14 extending therethrough which conforms to the configuration of wave guide members 7. A flange 15 is located on clamping members 2 and is adapted to be disposed within opening 6 against respective gaskets 16, as illustrated in FIGURE 3. A slot 17 is disposed in each side of clamping members 2, and a hole 18 is located also in each side of the clamping member. Holes 18, below slot 17, are threaded in order to receive screws 19 so that when clamping members 2 are placed onto wave guide members 7, they can be clamped tightly in place thereon by screwing screws 19 into the threaded sections of holes 18 thereby decreasing the width of slot 17. Recesses 20 are disposed adjacent the entrance to holes 18 in order to receive the heads of screws 19.

Projections 21 extend outwardly from the top and bottom surfaces of clamping members 2, and they preferably have the same configuration as projections 4 on housing member 1. A hole 22 is disposed in each of projections 21 and is in alignment with the respective threaded hole 5 of projections 4 so that screw members 23 extend through holes 22 and threadably engage threaded holes 5 in order to secure clamping members 2 onto housing member 1 and to cause flanges 15 to abut against gasket 16 in a sealing manner.

In assembly, clamping members 2 with screws 19 in a loose position, are placed on wave guide members 7, gasket 16 are then placed on the wave guide members and the ends of the wave guide members are inserted into opening 6 of housing member 1 so that stepped portions 13 thereof mate with flange sections 10 of aligning member 3, as illustrated in FIGURE 3. Screw members 23 are then inserted into holes 22 of projections 21 and the screw members are then threadably engaged in threaded holes 5 of projections 4, but screw members 23 are not moved to a tightened position, the screw members are moved to a near tight position. Screws 19 are tightened in holes 18 so that clamping members 2 are tightly clamped onto respective wave guide members 7. Screw members 23 are then tightened in holes 5 thereby causing stepped portions 13 to snugly engage flange sections 10 and flanges 15 to push gasket 16 into sealing engagement with flange 8 and retaining ring 12 to form a sealed joint in joining the ends of wave guide members 7. Flange sections 10 in engagement with stepped portions 13 of wave guide members 7 cause the ends of the wave guide members to be forced against flange 8 and retaining ring 12 thereby properly aligning the ends of the wave guide members so as to effect proper operation of the wave guide members.

Figures 4, 5:
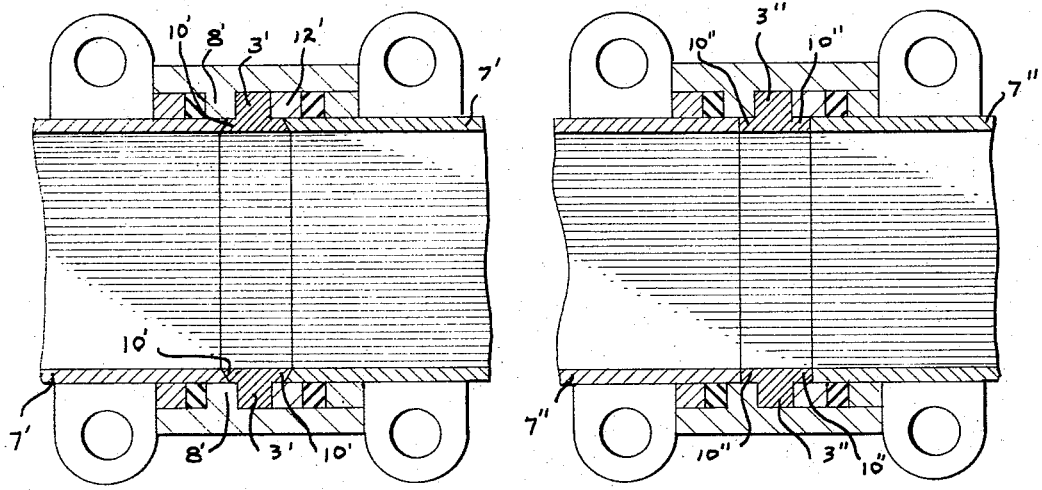
FIGURE 4 is a view similar to that of FIGURE 3 but illustrating an alternative embodiment.
FIGURE 5 is a view similar to that of FIGURE 3 but showing a further embodiment of the invention.

Flange sections 10' of aligning member 3' in the embodiment of FIGURE 4 has beveled ends which mate with beveled ends of wave guide members 7' in order to properly align the ends of the wave guide members and to force the ends thereof against flange 8' and retaining ring 12'. Flange sections 10'' of aligning member 3'' in the embodiment of FIGURE 5 has straight edges against which straight edges of the ends of wave guide members 7'' engage in order to properly align the ends of the wave guide members. The ends of the flange sections of aligning member 3 as well as the ends of wave guide members 7 can take any matable configurations that are desirable in order to properly align the ends of the wave guide members. As can be discerned, the aligning members are disposed in the center of the housing member so that equal parts of the ends of the wave guide members are disposed within the housing member. If desired, the aligning member may be eliminated and flange 8 can be continuous to include section 3 and retaining ring 12, as illustrated in FIGURE 6, and with this arrangement, the ends of the wave guide members abut against each other instead of against flange sections of an aligning member.

Thus, there has been disclosed a unique connection device showing the ends of wave guide members together in a properly aligned manner and the connection device is readily applied to the ends of wave guide members to interconnect them together.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A connection device for wave guide members comprising means clampingly engageable on said wave guide members proximate ends thereof, said clamping means being self-secured on said wave guide members in a manner sufficient to support an axial load, a one-piece housing means having an opening therethrough with said opening defining a configuration corresponding to the cross-sectional configuration of said wave guide members, and means to secure said clamping means to said housing means so that ends of said wave guide members are disposed adjacent and in alignment with each other within said opening.

2. A connection device according to claim 1 wherein aligning means is disposed in said housing means against which said ends of said wave guide members engage to center the ends of said wave guide members and to maintain the ends in alignment.

3. A connnection device according to claim 2 wherein stepped portions are disposed in said aligning means which are mateable with stepped portions in said ends of said wave guide members.

4. A connection device according to claim 2 wherein said aligning means include beveled edges mateable with beveled edges of said ends of said wave guide members.

5. A connection device to interconnect ends of wave guide members comprising clamping members for engaging and being clampable onto said wave guide members adjacent the ends thereof, said clamping members being self-secured on said wave guide members in a manner sufficient to support an axial load, a one-piece housing member having an opening therethrough corresponding to the cross-sectional configuration of said wave guide members, an aligning member in said opening against which said ends of said wave guide members engage, and means to secure said clamping members to said housing member to bring said ends of said wave guide members into engagement with said aligning member.

6. A connection device according to claim 5 wherein said aligning member includes flange sections extending outwardly therefrom in the direction said wave guide members extend and said flange sections have ends mateable with ends of said wave guide members.

7. A connection device according to claim 6 wherein said ends of said flange sections are spaced from said opening of said housing member defining stepped sections mateable with stepped portions in the ends of said wave guide members.

8. A connection device according to claim 6 wherein said ends of said flange sections and said wave guide members are beveled.

9. A coupling device for a pair of longitudinally extending members comprising clamping means clampable on said members adjacent ends thereof, said clamping means being self-secured on said members in a manner sufficient to support an axial load, a one-piece housing member having an opening extending therethrough for receiving the ends of said members, and means for securing said clamping means onto said housing member to couple said members together in alignment within said opening.

10. A coupling device for a pair of longitudinally extending members comprising clamping means clampable on said members adjacent ends thereof, said clamping means being self-secured on said members in a manner sufficient to support an axial load, a one-piece housing member having an opening extending therethrough for receiving the ends of said members, means in said housing member against which the ends of said members engage to center the members in said housing member and to align the ends of said members, and means for securing said clamping members onto said housing member to couple said members together and against said aligning means.

11. In a joint between wave guide members, clamping means clampingly secured on said wave guide members proximate each end thereof, said clamping means being self-secured on said wave guide members in a manner sufficient to support an axial load, a one-piece housing member having an opening extending therethrough, ends of said wave guide members being disposed within said opening with the ends in alignment, and means securing said clamping means onto said housing member to maintain the ends of the wave guide members in alignment.

12. In a joint according to claim 11 wherein aligning means is disposed in said opening of the housing member, flange sections on said aligning means mateable with the ends of said wave guide members.

13. For use in a joint connecting ends of tubular members together, clamping members for clampingly being secured on said tubular members adjacent the ends thereof, said clamping members being secured on said tubular members in a manner sufficient to support an axial load, one-piece housing means having an opening extending therethrough, said opening having a configuration corresponding to the cross-sectional configuration of said tubular members, aligning means disposed in said opening about midway of said housing means, and securing means for securing said clamping members to said housing means to mate the ends of said guide members with said aligning means to align said tubular members.

14. The joint according to claim 13 wherein sealing means are disposed between said clamping means and aligning means to form a sealed joint.

15. The joint according to claim 13 wherein said aligning means includes a flange extending outwardly from the surface of said opening, an aligning member disposed against said flange, and a retaining ring frictionally disposed in said opening against said aligning member to maintain said aligning member in position in said opening.

16. A coupling device to couple ends of wave guide members together comprising a housing member having an opening extending therethrough with said opening having a configuration corresponding to the cross-sectional configuration of said wave guide members so that ends of said wave guide members can be disposed against each other and in alignment with each other within said opening to provide a continuous inner surface between the wave guide members, clamping members clampingly engageable on the wave guide members proximate the ends thereof, said clamping members being self-secured on said wave guide members in a manner sufficient to support an axial load, and means to secure said clamping members to ends of said housing member.

17. A coupling device for coupling together ends of wave guide members comprising a housing member having a continuous opening extending therethrough, said opening having a configuration corresponding to the cross-sectional configuration of said wave guide members so that the ends of the wave guide members are disposed adjacent and in alignment with each other within said opening thereby providing a continuous inner surface between the wave guide members, clamping members clampingly engageable on the wave guide members adjacent the ends thereof, said clamping members being self-secured on said wave guide members in a manner sufficient to support an axial load, and securing means on said clamping members and ends of said housing member for securing said clamping members at said ends of said housing member to maintain the ends of the wave guide members within said opening of said housing member and in strict alignment.

References Cited

UNITED STATES PATENTS

| 2,340,732 | 2/1944 | Bruno | 285—363 |
| 2,558,695 | 6/1951 | Unger | 285—363 |

FOREIGN PATENTS

| 1,080,162 | 4/1966 | Germany. |

HERMAN KARL SAALBACH, *Primary Examiner.*

L. ALLAHUT, *Assistant Examiner.*